US012670130B2

(12) United States Patent
Halko

(10) Patent No.: US 12,670,130 B2
(45) Date of Patent: Jun. 30, 2026

(54) RECORD MANAGEMENT FOR DATABASE SYSTEMS USING FUZZY FIELD MATCHING

(71) Applicant: Salesforce, Inc., San Francisco, CA (US)

(72) Inventor: Nathan Halko, Boulder, CO (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/625,076

(22) Filed: Apr. 2, 2024

(65) Prior Publication Data

US 2024/0248882 A1     Jul. 25, 2024

Related U.S. Application Data

(63) Continuation of application No. 17/659,615, filed on Apr. 18, 2022, now Pat. No. 11,995,046.

(51) Int. Cl.
*G06F 16/21*          (2019.01)
*G06F 16/2458*        (2019.01)

(52) U.S. Cl.
CPC .......... *G06F 16/21* (2019.01); *G06F 16/2468* (2019.01)

(58) Field of Classification Search
CPC .... G06F 16/21; G06F 16/2468; G06F 16/215; G06F 16/24568
See application file for complete search history.

(56) References Cited

U.S. PATENT DOCUMENTS 5,577,188 A     11/1996  Zhu
5,608,872 A      3/1997  Schwartz et al.

5,649,104 A     7/1997  Carleton et al.
5,715,450 A     2/1998  Ambrose et al.
5,761,419 A     6/1998  Schwartz et al.
(Continued)

OTHER PUBLICATIONS

Raimondas Kiveris, et al, Connected Components in MapReduce and Beyond, SOCC '14: Proceedings of the ACM Symposium on Cloud Computing, Nov. 2014 pp. 1-13, https://dl.acm.org/doi/proceedings/10.1145/2670979).
(Continued)

*Primary Examiner* — Khanh B Pham
*Assistant Examiner* — Kweku William Halm
(74) *Attorney, Agent, or Firm* — Ingrassia Fisher & Lorenz, LLP

(57)          ABSTRACT

Devices, systems and methods are provided for managing records. One method involves constructing a fuzzy match graph data structure with edges between different field values for a fuzzy matched field of a plurality of records in accordance with a matching rule, assigning unique identifiers to different subgraphs of field values within the fuzzy match graph data structure, determining a match key value associated with a respective record based on a respective unique identifier assigned to a respective subgraph of field values including a respective field value for the fuzzy matched field of the respective record, constructing a heterogenous graph data structure having edges between the respective match key values associated with the respective records of the plurality of records, identifying a subset of related records using the heterogenous graph data structure, and performing one or more actions on the subset of related records at a database system.

19 Claims, 10 Drawing Sheets

(56) References Cited

U.S. PATENT DOCUMENTS

| | | | |
|---|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |

| | | | |
|---|---|---|---|
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 10,685,131 B1* | 6/2020 | Lunsford | G06F 21/316 |
| 11,514,054 B1 | 11/2022 | Borthwick et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249789 A1 | 12/2004 | Kapoor et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0032556 A1 | 1/2014 | Bayliss | |
| 2015/0254329 A1 | 9/2015 | Agarwal et al. | |
| 2016/0314172 A1 | 10/2016 | Morton et al. | |
| 2017/0052958 A1* | 2/2017 | Manning | G06F 16/35 |
| 2019/0370406 A1* | 12/2019 | Bose | G06F 3/0629 |

(56)              References Cited

U.S. PATENT DOCUMENTS

| | | | |
|---|---|---|---|
| 2021/0004582 A1* | 1/2021 | Evans | G06F 16/9014 |
| 2021/0081380 A1* | 3/2021 | Shen | G06F 16/24556 |
| 2021/0165931 A1* | 6/2021 | Fuerst | G06F 30/20 |

OTHER PUBLICATIONS

Wikipedia, Bron-Kerbosch Algorithm, https://en.wikipedia.org/wiki/Bron%E2%80%93Kerbosch_algorithm.

* cited by examiner

300

| Record ID | firstName | lastName | email |
|-----------|-----------|----------|-------|
| rec1 | James | Smith | user1@domain |
| rec2 | Jim | Smith | user1@domain |
| rec3 | Jim | Smithe | user1@domain |
| rec4 | Ted | Smyth | user1@domain |
| rec5 | Jimmy | Smyth | user1@domain |
| rec6 | James | Smith | user2@domain |

FIG. 3

| key | SRIs |
|-----|------|
| Jimmy | 1 |
| James | 1 |
| Jim | 1 |

500

400

| key | SRIs |
|---|---|
| Smith | 2 |
| Smithe | 2,3 |
| Smyth | 3 |

700

600

| Entity ID | Record ID | firstName | lastName | email |
|-----------|-----------|-----------|----------|-------|
| Entity1 | rec1 | James | Smith | user1@domain |
| Entity1 | rec2 | Jim | Smith | user1@domain |
| Entity1 | rec3 | Jim | Smithe | user1@domain |
| Entity1 | rec5 | Jimmy | Smyth | user1@domain |
| Entity2 | rec4 | Ted | Smyth | user1@domain |
| Entity3 | rec6 | James | Smith | user2@domain |

| entity_id | firstName | lastName | email | street_address | city | state |
|-----------|-----------|----------|-------|----------------|------|-------|
| Entity1 | James | Smith | user1@domain | 123 Main Street | Boulder | CO |

1100

RECORD MANAGEMENT FOR DATABASE SYSTEMS USING FUZZY FIELD MATCHING

CROSS-REFERENCE TO RELATED APPLICATIONS

This application is a continuation of U.S. patent application Ser. No. 17/659,615, filed Apr. 18, 2022, the contents of which are hereby incorporated by reference.

TECHNICAL FIELD

One or more implementations relate to the field of database systems, and more specifically, to matching and reconciling related records using a heterogenous graph structure with fuzzy field matching.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects. Often, it is desirable to retrieve or incorporate data or information from various different websites, platforms, database systems, or the like into a single web application or website in order to enhance or otherwise improve the user experience. However, as the number of potential data sources and the amount of data increases, the likelihood of duplicate or redundant data entries existing within the system also increases. Duplicate data entries not only undesirably waste computing resources, but also have the potential to confuse or frustrate users or cause conflicts within the system. While various record matching and deduplication techniques exist, they often require database queries to fetch records and compare fields that result in a multiplicative load that does not scale as the number of records and/or fields increases, resulting in prohibitive time and hardware computing resource requirements for large datasets. Accordingly, methods and systems are desired for providing scalable record matching and reconciliation to help limit or otherwise prevent the proliferation of duplicate data entries in large datasets.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 depicts an exemplary set of records suitable for use with the fuzzy field mapping process of FIG. 2 according to an example implementation;

DETAILED DESCRIPTION

Figure 1:
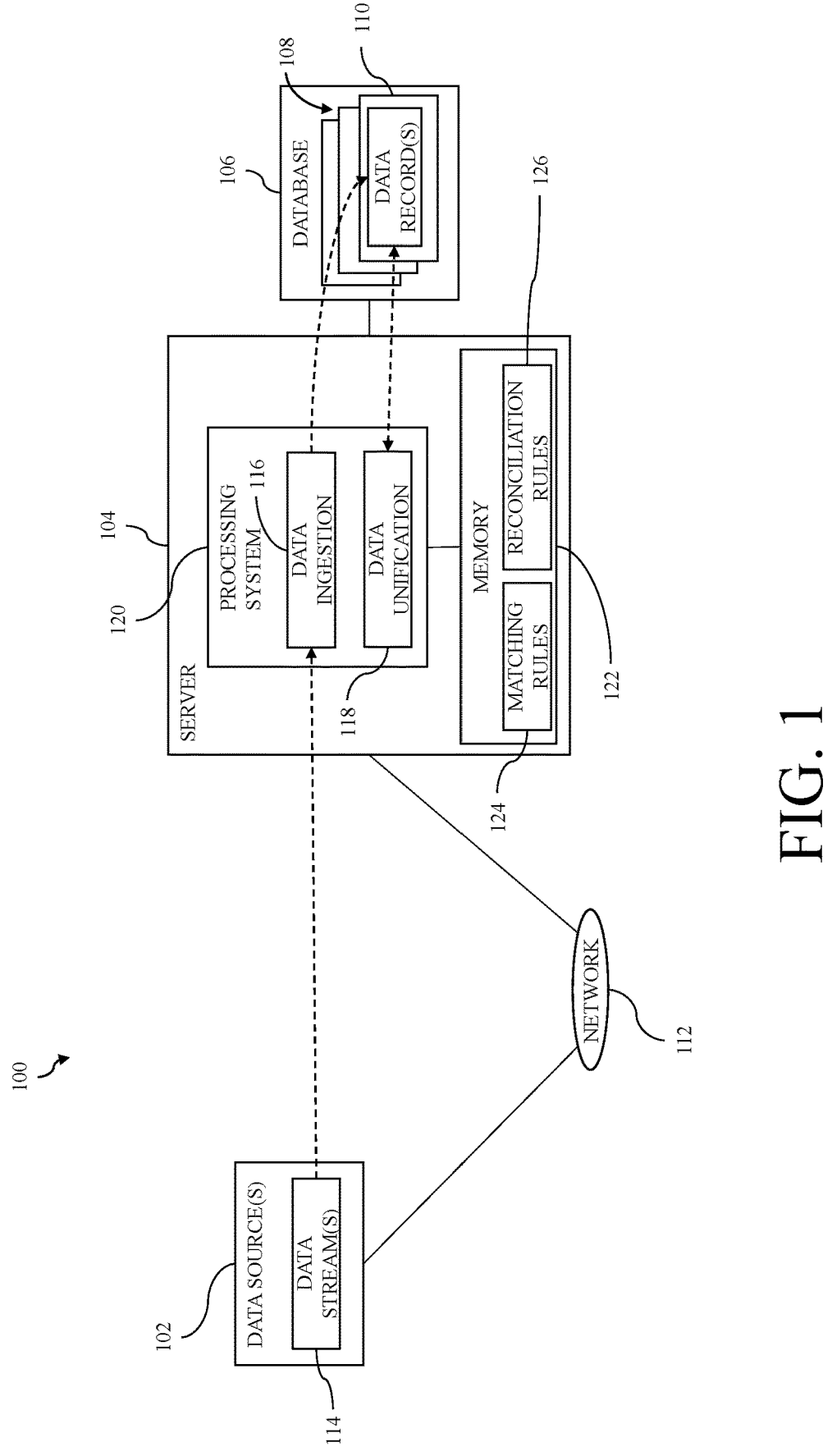
FIG. 1 is a block diagram illustrating a system including a data unification service that supports a heterogeneous matching process according to some example implementations.

The following description describes implementations for managing related records at a database system using a matching process that leverages a heterogenous graph data structure to identify groups of records that are likely to refer to the same entity across and/or within different data sources or systems. The heterogeneous graph structure links records that share one or more common match key values that correspond to fuzzy matched fields indicative of related records. In this regard, the match key values effectively incorporate the logic of the underlying fuzzy field matching rules into vertices of the heterogeneous graph structure to link related records based on match key values without requiring database queries to find matching records, thereby reducing the computational resource requirements and costs relative to other approaches.

As described in greater detail below, in exemplary implementations, a fuzzy match graph is constructed on one or more fields of interest by creating edges between different field values identified from different ones of the records of interest based on the field(s) of the records in accordance with one or more fuzzy field matching rules. Different connected subgraphs of field values within the fuzzy match graph data structure are identified, and each connected subgraph is assigned a unique identifier, alternatively referred to as a fuzzy match identifier or synonym ring identifier, which, in turn, is utilized to maintain an association with the respective records having field values belonging to that subgraph. For each respective record, one or more match key values to be associated with the respective record are determined based on the respective fuzzy match identifiers assigned to the different subgraphs of records that include the field value(s) of that respective record, for example, by computing a hash value of the fuzzy match identifiers assigned to the record.

After determining and assigning match key values to the different records based on the respective fuzzy match identifiers assigned to the respective records, the heterogeneous graph data structure is constructed by creating edges that link records that share a common match key value. In this regard, records that fuzzy match relevant fields in accordance with the fuzzy field matching rules may be assigned a common match key value even though the relevant fields may not be an exact match across those records. The heterogeneous graph data structure is then utilized to identify subsets of related records for entity resolution or other subsequent processing and/or analysis. For example, a subset of related records may be reconciled or unified to establish a representative record (e.g., by creating a unified data record or database object), or other data cleansing, normalizing, validation and/or the like may be performed to mitigate erroneous or outdated field values, deduplicate data records, eliminate redundancies, and/or the like.

By virtue of the matching processes described herein, groups of records that refer to the same entity across and/or within different data sources may be more quickly identified using less computational resources compared to other approaches. For example, compared to an approach that constructs a graph between all records involved in each database query (which is an f×log(n) operation where f is number of fields or foreign keys per record and n is total number of records) in connection with pruning non-matching results and clustering related records using a fuzzy query (which can be an F×log(n) operation where F>f), using match key values as vertices in a heterogeneous graph structure allows matching groups of records to be found by virtue of their edges to/from common match key values that themselves are derived from groups of fuzzy match identifiers. Since the number of fuzzy match identifiers (t) is much smaller than the number of fields or foreign keys per record and the number of distinct field values (k) is much smaller than total number of records (n), with one query per fuzzy match identifier, the resulting query operations are t×log(k), where t<<F and k<<n, such the matching processes described herein scale to larger data sets (e.g., where n and F increase at a greater rate than t and k) and reduce computational load relative to other approaches.

FIG. 1 depicts an exemplary system 100 for managing data provided by any number of different data sources 102. The system 100 includes at least one server 104 that is coupled to at least one database 106 to store or otherwise maintain data received from the data sources 102 as different records 110 in different tables 108 at the database 106. The data source(s) 102 are communicatively coupled to the server 104 over a communications network 112, such as the Internet or any sort or combination of wired and/or wireless computer network, a cellular network, a mobile broadband network, a radio network, or the like. The data source(s) 102 provide one or more different data streams 114 to a data ingestion service 116 at the server 104 that stores or otherwise maintains the data contained in the data streams 114 in corresponding data records 110 at the database 106. As described in greater detail below, a data unification service 118 at the server 104 utilizes matching rules 124 and entity resolution rules 126 to identify subsets of related records 110 at the database 106 and perform corresponding actions to unify or otherwise reconcile related records 110, as described in greater detail below.

The one or more data sources 102 generally represent any number or sort of computing system(s), database management system(s), resource management system(s) or any other computing device(s), system(s) or platform(s) that maintain data, information, or other resources. For example, in some implementations, a data source 102 includes one or more servers communicatively coupled to the network 112 to support access to data, information, or other resources maintained at the data source 102. For example, a source computing system 102 may maintain, on behalf of a user (or resource owner), data records entered or created by the user, files, objects or other records uploaded by the user, and/or files, objects or other records generated by one or more computing processes (e.g., based on user input or other records or files stored at the source computing system 102). In one or more implementations, the data sources 102 support one or more application program interfaces (APIs) or other processes that allow the data sources 102 to transmit or otherwise provide one or more data streams 114 to the data ingestion service 116 at the server 104 maintain corresponding data records 110 in the database 106 that reflect data originally obtained and/or maintained at a respective data source 102. For example, the data streams 114 may include new or updated data records from the data source 102 that were created, updated and/or modified at the respective data source 102 in the intervening period after transmitting a preceding data stream 114.

The server 104 generally represents one or more server computing devices, server computing systems or another combination of processing logic, circuitry, hardware, and/or other components configured to support the data ingestion service 116, the data unification service 118 and related record matching processes, tasks, operations, and/or functions described herein. In this regard, the server 104 generally includes at least one processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system 120 may include or otherwise access a data storage element 122 (or memory) capable of storing programming instructions for execution by the processing system, that, when read and executed, are configurable cause processing system to create, generate, or otherwise facilitate the data unification service 118 based at least in part upon code and other data, such as one or more matching rules 124 and/or one or more entity resolution rules 126, that is stored or otherwise maintained by the memory 122 to support the matching processes described herein. Depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof.

In one or more implementations, the executable code associated with the data ingestion and unification services 116, 118 is configurable to cause the processing system 120 to generate or otherwise provide one or more graphical user interface (GUI) displays at a client device that allow a human user to remotely configure one or more of the data ingestion service 116, the data unification service 118, the matching rules 124 and/or the resolution rules 126, as described in greater detail below. In this regard, the client device may be realized as any sort of personal computer, mobile telephone, tablet or other network-enabled electronic device coupled to the network 112 that executes or otherwise supports a web browser or other client application that allows a user to access the configuration GUI displays provided by the server 104 and/or processing system 120. The configuration GUI displays allow a user to identify, configure or otherwise define the different data sources 102 and/or data streams 114 to be ingested by the data ingestion service 116, the matching rules 124 to be utilized by the data unification service 118 to identify related subsets of records 110 in the database 106 and/or the resolution rules 126 to be utilized by the data unification service 118 to process or otherwise perform additional actions on the related subsets of records 110 identified using the matching rules 124.

As described in greater detail below, the matching rules 124 define the subsets of fields of data records 110 in the database 106 that need to match in order for the two or more records to match, and whether those fields must be matched exactly or fuzzy. For example, a matching rule to identify related records 110 associated with the same person or contact may be defined to require a fuzzy match on a first name field of the records 110, a fuzzy match on a last name field of the records 110, and an exact match on an email field of the records 110. The matching rules 124 may also define fuzzy match criteria for the fuzzy matched fields, that is, what degree of similarity is required between two different values to be a fuzzy match (e.g., similarity in spelling, pronunciation or homophones, and/or the like). In this regard, for a fuzzy matched field, when two different values satisfy the fuzzy match criteria, the two different values may be considered to be a fuzzy match.

The matching rules 124 are utilized by the data unification service 118 to construct a fuzzy match graph data structure for each of the fuzzy matched fields. The fuzzy match graph data structure includes edges between different ones of the records of interest based on the similarity of the respective values for the fuzzy matched field of the respective records. In other words, the fuzzy match graph is a graph data structure on field values for a fuzzy matched field of a match rule where edges between different field values represent synonymous field values. Within the fuzzy match graph data structure, fully connected subgraphs of field values where each field value is a direct fuzzy match with (or synonymous with) all other field values in the subgraph (e.g., a group of vertices with an edge between every pair) are identified. A fully connected subgraph of field values, alternatively referred to as a synonym ring, is assigned a unique identifier, alternatively referred to as a fuzzy match identifier or synonym ring identifier. The fuzzy match identifiers are utilized by the data unification service 118 to map field values of a record to one or more fuzzy match identifiers, which are then utilized by the data unification service 118 to determine one or more match key values for the record based at least in part on the fuzzy match identifiers. For example, in one embodiments, the data unification service 118 calculates or otherwise determines a match key value for a record 110 by taking a hash of the fuzzy match identifiers assigned to the record 110 for the fuzzy matched fields of the record 110 and the actual field values for any exact matched fields of the record 110.

After determining and assigning match key values to the records 110 of interest, the data unification service 118 constructs a heterogenous graph data structure on the records 110 of interest where the different match key values function as vertices in the heterogenous graph data structure that link different records 110 sharing a common match key value, thereby incorporating the logic of the matching rules 124 into the heterogenous graph data structure. The heterogeneous graph data structure is utilized to identify subsets of related records, for example, by clustering connected records that share at least one match key value.

In one or more implementations, for each subset of related records identified from the heterogeneous graph data structure, the data unification service 118 performs one or more actions on the subset of related records in accordance with the reconciliation rules 126 to clean, deduplicate, reconcile or otherwise unify data across one or more of the related records. For example, the reconciliation rules 126 may include logic or other criteria to identify which field values from which of the related records 110 should be utilized to augment, correct or otherwise modify one or more fields of the other related records 110, or the reconciliation rules 126 may include logic or other criteria that define the manner in which the data unification service 118 creates a new record 110 in the database 106 for an entity to be associated with the subset of related records 110. For example, for an individual person or contact, the reconciliation rules 126 may be utilized by the data unification service 118 to create a unified record 110 for that individual or contact in the database 106 that functions as a top level entity to which the other related records 110 associated with the same person or contact may be associated with. That said, in other embodiments, the reconciliation rules 126 may be utilized by the data unification service 118 to perform deduplication or otherwise remove redundant records 110 from the database 106 and/or from the data streams 114 prior to committing records from the ingested data streams 114 to the database 106. In this regard, although FIG. 1 depicts the data ingestion service 116 and the data unification service 118 as separate, standalone processes or services, in practice, the data ingestion service 116 and the data unification service 118 may be integrated or otherwise combined such that the matching and entity resolution processes are performed in concert with the data ingestion prior to importing new records from a received data stream 114 to the database 106. That said, in other embodiments, the data unification service 118 may be a separate, standalone process or service that can be invoked by the data ingestion service 116 for post-processing after ingesting a data stream 114 and importing new records to the database 106.

Figure 2:
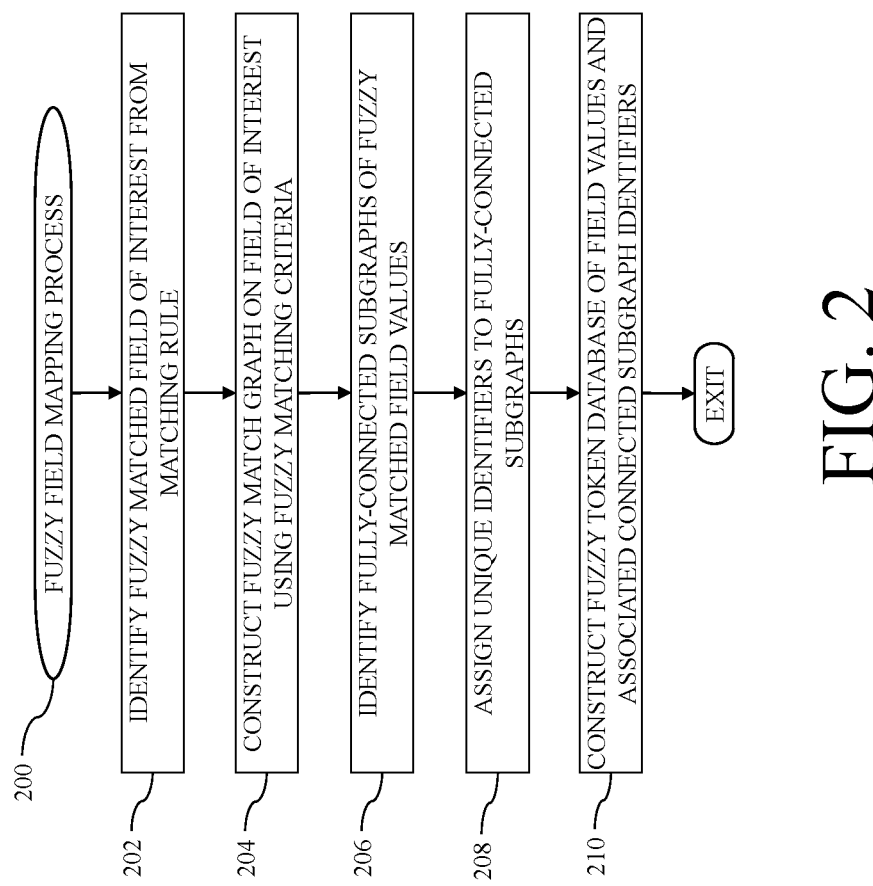
FIG. 2 is a flow diagram illustrating a fuzzy field mapping process suitable for use with the data unification service in the system of FIG. 1 according to some example implementations.

FIG. 2 depicts an exemplary fuzzy field mapping process 200 that may be implemented or otherwise performed by a data unification service in connection with a matching process to map synonymous or substantially equivalent values for a fuzzy matched field to a unique identifier that maintains an association between those fuzzy matched field values and perform additional tasks, functions, and/or operations described herein. For illustrative purposes, the following description may refer to elements mentioned above in connection with FIG. 1. In this regard, while portions of the fuzzy field mapping process 200 may be performed by different elements of the system 100, for purposes of explanation, the subject matter is described herein in the context of the fuzzy field mapping process 200 being primarily performed by the data unification service 118 at the server 104. It should be appreciated that the fuzzy field mapping process 200 may include any number of additional or alternative tasks, the tasks need not be performed in the illustrated order and/or the tasks may be performed concurrently, and/or the fuzzy field mapping process 200 may be incorporated into a more comprehensive procedure or process having additional functionality not described in detail herein. Moreover, one or more of the tasks shown and described in the context of FIG. 2 could be omitted from a practical implementation of the fuzzy field mapping process 200 as long as the intended overall functionality remains intact.

In exemplary implementations, the fuzzy field mapping process 200 is performed in connection with a matching process, such as the heterogenous matching process 800 of FIG. 8 described below, to identify related records at or within a data stream, a data table a database or the like. The fuzzy field mapping process 200 is performed for fuzzy matched fields of any applicable matching rules to develop a fuzzy token database that maps different field values for a respective fuzzy matched field to corresponding fuzzy match identifiers (or synonym ring identifiers) that may be utilized by the subsequent matching process to identify related records with substantially similar field values.

Referring to FIG. 2 with continued reference to FIG. 1, for a given matching rule of interest, the fuzzy field mapping process 200 begins by identifying a fuzzy matched field of the matching rule for which a corresponding fuzzy match graph data structure is to be constructed and generates or otherwise constructs a fuzzy match graph data structure on the different record values for that field of interest in accordance with the fuzzy matching criteria associated with the matching rule (tasks 202, 204). For example, a matching rule to identify related records belonging to the same individual or contact point may be defined as "fuzzy(firstName) AND fuzzy(lastName) AND exact(email)," such that related records will be identified that have the exact same or equal value for the email field of the record and fuzzy match both the first and last name fields of the record. In this exemplary implementation, the data unification service 118 performs the fuzzy field mapping process 200 to construct a fuzzy match graph data structure and identify corresponding fuzzy match identifiers (or synonym ring identifiers) for both the firstName field of the records of interest and the lastName field of the records of interest. It will be appreciated that the fuzzy match graph data structure can be implemented using any suitable data structure, including, but not limited to, an adjacency list, an edge list, an adjacency matrix, or the like, and the subject matter described herein is not limited to any particular type of data structure for representing the fuzzy match graph data structure.

After constructing the fuzzy match graph data structure, the fuzzy field mapping process 200 analyzes the fuzzy match graph data structure to identify fully-connected subgraphs of fuzzy matched field values within the fuzzy match graph data structure and automatically assigns a unique identifier to each distinct fully-connected subgraph (tasks 206, 208). In this regard, a fully-connected subgraph is realized as a subset or group of vertices within the fuzzy match graph data structure where there is an edge between every pair of vertices within the group, that is, where every field value within the subgraph is a fuzzy match with all other field values in that subgraph. Each fully-connected subgraph is assigned a unique fuzzy match identifier (or synonym ring identifier) that is utilized to associate different, yet synonymous or substantially similar, fuzzy matched field values to one another. After assigning unique identifiers to the different fully-connected subgraphs of field values, the fuzzy field mapping process 200 generates or otherwise constructs a fuzzy token database that maintains an association between the different fuzzy match identifiers and the corresponding field values associated therewith (task 210).

FIGS. 3-7 depict an exemplary set of records 300 (e.g., records 110) that include a firstName field, a lastName field and an email field and corresponding fuzzy match graph data structures 400, 600 and the resulting fuzzy token databases 500, 700 in accordance with an exemplary implementation of the fuzzy field mapping process 200 of FIG. 2 for a matching rule of "fuzzy(firstName) AND fuzzy(lastName) AND exact(email)." Referring to FIGS. 3-7 with continued reference to FIGS. 1-2, depending on the implementation, the records 300 depicted in FIG. 3 may be obtained from different data sources 102, different data streams 114 and/or different data tables 108 in the database 106, or the records 300 may all be associated with a common data source 102, data stream 114 and/or data table 108. For example, the fuzzy field mapping process 200 may be performed in connection with a matching process that attempts to identify related records 110, 300 from different data sources 102, for example, by matching a record for an individual or contact point that was previously obtained from database management system or resource management system with a related record for the same individual or contact point imported from an on-demand application platform.

Figure 5:
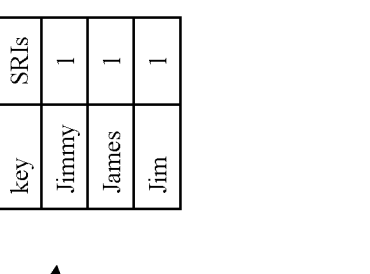
FIG. 5 depicts a fuzzy token database for a firstName field of the records of FIG. 3 suitable for use with the fuzzy field mapping process of FIG. 2 according to an example implementation.
Figure 4:
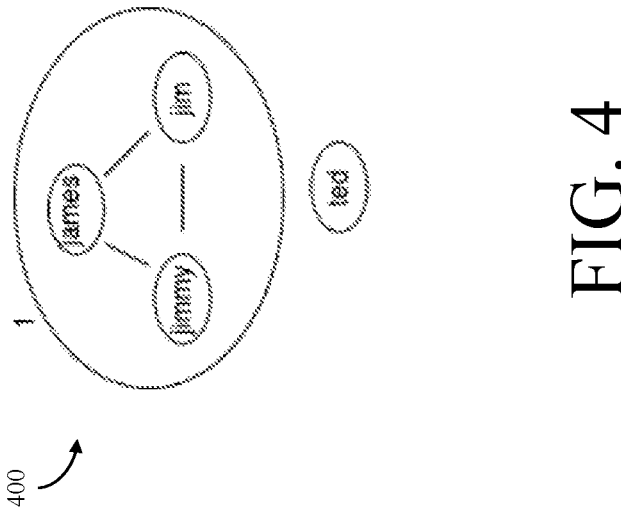
FIG. 4 depicts a fuzzy match graph data structure for a firstName field of the records of FIG. 3 suitable for use with the fuzzy field mapping process of FIG. 2 according to an example implementation.

Referring to FIGS. 3-5, the data unification service 118 and/or the fuzzy field mapping process 200 identifies the firstName field of the records 300 as a fuzzy matched field of interest defined by the matching rule and constructs the corresponding fuzzy match graph data structure 400 on the different values for the firstName field of the records 300 using the fuzzy matching criteria associated with the matching rule to create edges between substantially similar fuzzy matched firstName field values based on semantic similarity, similar pronunciation (or homophones), similar spelling, and/or the like. In this regard, in some implementations, blocking key techniques such as q-grams, locality-sensitive hashing, phonetic transformations or the like may be utilized to map each different firstName field value to a corresponding set of blocking keys, which, in turn may be utilized to group together field values that share a common blocking key and form edges between matching values based on the blocking keys and/or the pairwise distance between values in each block using a fuzzy match model (e.g., curated positive training pairs such as Bob and Robert, Peggy and Margaret, James and Jim, etc.). For example, given the firstName field values for the records 300 of FIG. 3, 3-gram blocking key values with a sliding window of length of 3 may be identified as "jim," "imm," "mmy," "jam," "ame," "mes" and "ted," with the blocking key value of "jim" identifying a potential match between "Jim" and "Jimmy" since both field values include the blocking key value of "jim" therein. In this regard, the blocking keys, known positive pairs from fuzzy match model training data (e.g., "James" and "Jim" as a semantically similar fuzzy match) or other field values from the records (e.g., email to link "James" and "Jimmy" via a common email address associated therewith) may be utilized to group potential matches in a manner that avoids an all pairs comparison of firstName fields. Additionally, the edges between field value vertices may be weighted or otherwise assigned values that represent the perceived strength or confidence in a match between values.

Thereafter, a clustering technique may be applied to identify the fully-connected subgraphs of field values, that is, different groups of potential first name field values where the pairwise edges or distance between every pair of vertices within the group is indicative of a fuzzy match with a desired level of confidence or similarity. For example, for the fuzzy match graph data structure where the edges previously computed may be distributed and highly replicated, the resulting may be input into a connected components algorithm to form sets representing connected subgraphs (e.g., by recomputing edges within each connected subgraph to recover the graph structure and collect vertices into connected subgraph sets). Thereafter, a Bron-Kerbosch algorithm or similar algorithm may be utilized to find all maximal cliques or fully connected subgraphs within each connected subgraph identified via the preceding connected components algorithm. In this regard, the two step process of applying a connected components algorithm followed by a maximal clique finding algorithm is useful because each connected subgraph can be processed or analyzed in parallel around a distributed compute cluster to find the fully connected subgraphs within each connected subgraph concurrently.

As shown in FIG. 4, based on the edges between the vertices associated with the Jimmy, James and Jim firstName field values derived from the records 300, the subset of firstName field values Jimmy, James and Jim is identified as a fully-connected subgraph of firstName field values and is assigned the unique synonym ring identifier (SRI) of 1. Thereafter, the data unification service 118 implementing the fuzzy field mapping process 200 generates or otherwise creates a corresponding fuzzy token database 500 (e.g., in memory 122 or in the database 106) that maps each of the firstName field values of Jimmy, James and Jim to the assigned SRI of 1, as shown in FIG. 5. It should be noted that the firstName field value of Ted does not have any edges to any other firstName field values, and therefore, is not assigned an SRI in the fuzzy token database 500 given the absence of any fuzzy matches for the value Ted.

Figures 6, 7:
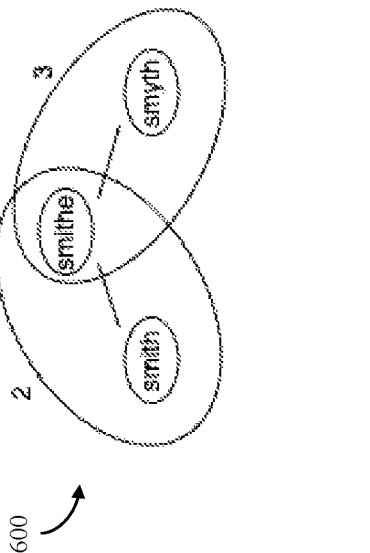
FIG. 6 depicts a fuzzy match graph data structure for a lastName field of the records of FIG. 3 suitable for use with the fuzzy field mapping process of FIG. 2 according to an example implementation.
FIG. 7 depicts a fuzzy token database for a lastName field of the records of FIG. 3 suitable for use with the fuzzy field mapping process of FIG. 2 according to an example implementation.

Referring to FIGS. 6-7, the data unification service 118 and/or the fuzzy field mapping process 200 also identifies the lastName field of the records 300 as a second fuzzy matched field of interest defined by the matching rule and constructs the corresponding fuzzy match graph data structure 600 on the different values for the lastName field of the records 300 using the fuzzy matching criteria associated with the matching rule to create edges between substantially similar fuzzy matched lastName field values based on semantic similarity, similar pronunciation (or homophones), similar spelling, and/or the like. In the implementation depicted in FIG. 6, a first fully-connected subgraph of field values is identified that includes the typographically similar values Smith and Smithe, assigned an SRI of 2, and a second fully-connected subgraph of field values is identified that includes the phonetically similar values Smithe and Smyth, assigned an SRI of 3. Thereafter, the data unification service 118 generates or otherwise creates a corresponding fuzzy token database 700 that maps each of the lastName field values of Smith, Smithe and Smyth to corresponding SRIs that include those values. In this regard, the lastName field value of Smithe is assigned to two different SRIs because Smithe belongs to two distinct fully-connected subgraphs within the lastName fuzzy match graph data structure 600.

Figure 8:
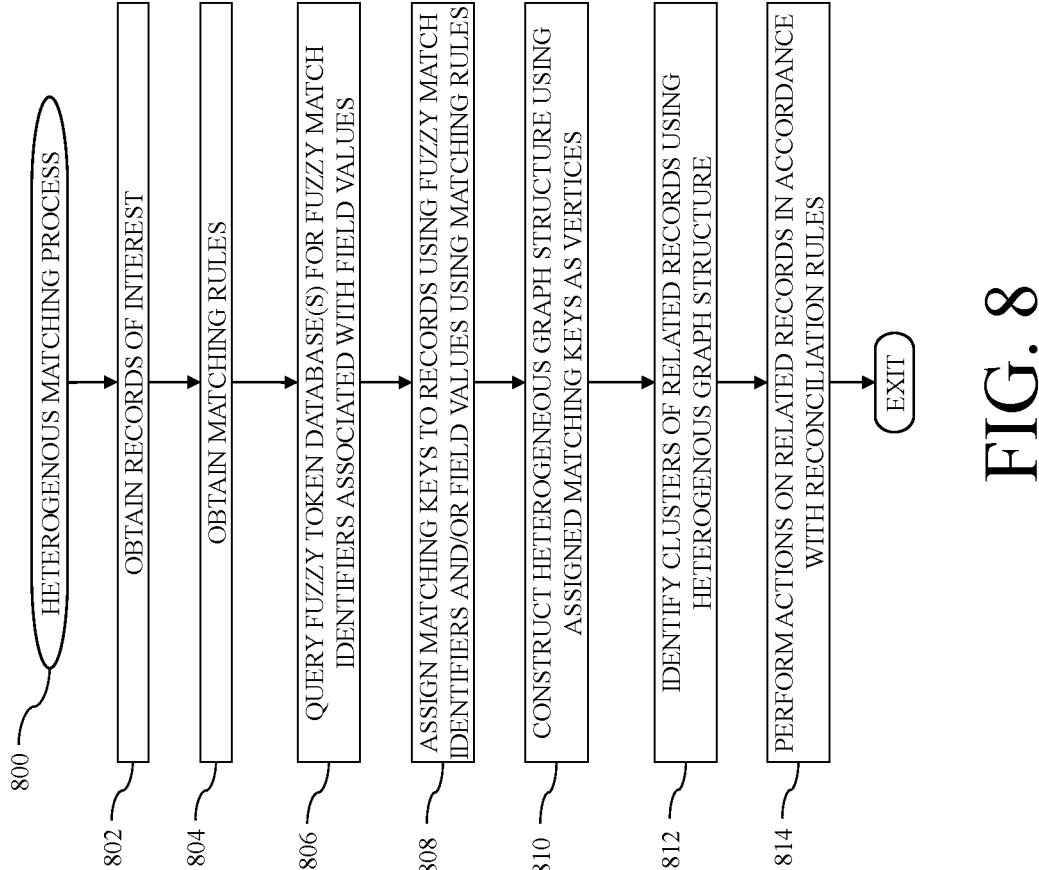
FIG. 8 is a flow diagram illustrating a heterogeneous matching process suitable for use with the data unification service in the system of FIG. 1 and the fuzzy field mapping process of FIG. 2 according to some example implementations.

FIG. 8 depicts an exemplary heterogenous matching process 800 that may be implemented or otherwise performed by a data unification service to identify related records and perform additional tasks, functions, and/or operations described herein. For illustrative purposes, the following description may refer to elements mentioned above in connection with FIG. 1. In this regard, while portions of the heterogenous matching process 800 may be performed by different elements of the system 100, for purposes of explanation, the subject matter is described herein in the context of the heterogenous matching process 800 being primarily performed by the data unification service 118 at the server 104. It should be appreciated that the heterogenous matching process 800 may include any number of additional or alternative tasks, the tasks need not be performed in the illustrated order and/or the tasks may be performed concurrently, and/or the heterogenous matching process 800 may be incorporated into a more comprehensive procedure or process having additional functionality not described in detail herein. Moreover, one or more of the tasks shown and described in the context of FIG. 8 could be omitted from a practical implementation of the heterogenous matching process 800 as long as the intended overall functionality remains intact.

Referring to FIG. 8 with continued reference to FIGS. 1-7, in exemplary implementations, the heterogeneous matching process 800 is initiated or otherwise performed by the data unification service 118 at the server 104 in connection with importing records 110 to the database 106 from one or more different data sources 102. In this regard, depending on the implementation, the heterogeneous matching process 800 may be performed prior to or concurrently with the ingestion of a data stream 114 (e.g., to prevent introducing duplicate or redundant records to the database 106) or after ingesting a data stream 114 to reconcile, deduplicate or otherwise unify newly added or changed records 110 in the database 106 with other preexisting records in the database 106. The heterogeneous matching process 800 begins by identifying or otherwise obtaining the records of interest to be analyzed and identifying or otherwise obtaining the corresponding matching rules to be utilized to analyze the desired set of records for related records (tasks 802, 804). For example, prior to execution of the heterogeneous matching process 800, an individual user, organization or tenant may configure the data unification service 118 and the corresponding matching and reconciliation rules 124, 126 to define the identifying information or other criteria that dictate which records 110 belonging to that user, organization or tenant are to be analyzed, along with defining the matching rules 124 or other matching criteria to be utilized to identify related records and defining the reconciliation rules 126 that dictate the actions to be performed on related records identified by the heterogeneous matching process 800.

The heterogeneous matching process 800 continues by querying the fuzzy token database(s) to identify the fuzzy match identifiers associated with the different field values for the different fields of interest identified by the matching rule(s) and automatically assigning match key values to each of the records of interest to be analyzed based at least in part on the fuzzy match identifier(s) mapped to the respective record using the matching rules (tasks 806, 808). In exemplary implementations, the data unification service 118 calculates or otherwise determines a match key value to be assigned to a particular record as a function of the fuzzy match identifier(s) mapped to the field values of the respective record for any fuzzy matched fields of the applicable matching rule and/or the actual field values of the respective record for any exact matched fields of the applicable matching rule or for any fuzzy matched fields where no fuzzy match identifier exists. For example, for the matching rule of "fuzzy(firstName) AND fuzzy(lastName) AND exact (email)," the data unification service 118 may calculate the match key value by taking a hash of the fuzzy match identifier(s) mapped to the value of the firstName field of a record, the fuzzy match identifier(s) mapped to the value of the lastName field of a record, and the value of the email field of the record.

After assigning match key values to the records of interest, the heterogeneous matching process 800 generates or otherwise constructs a heterogeneous graph data structure that includes the records of interest and their associated match keys as vertices (task 810). In this regard, the heterogeneous graph data structure includes a node or vertex corresponding to an individual record along with an edge from that node or vertex to another node or vertex corresponding to the match key value assigned to that record. Thus, different records having the same match key value in common may have corresponding edges to/from that match key vertex in the heterogeneous graph data structure and the respective record vertex. In exemplary implementations, the heterogeneous graph data structure does not include any direct edges between two different records, and different records are not physically grouped together during the heterogeneous matching process 800 until after construction of the heterogeneous graph data structure (e.g., after clustering during reconciliation and/or unification of related records). This is particularly advantageous in a distributed system because it does not require communication and data transfer between different computing devices or systems in order to physically group together record data at the same physical location (e.g., at a common computing device or processor).

After constructing the heterogeneous graph data structure, the heterogeneous matching process 800 analyzes the heterogeneous graph data structure using one or more clustering techniques to identify clusters of related records (task 812). For example, a connected components algorithm may be applied to the heterogeneous graph data structure to find connected subgraphs, where each connected subgraph is resolved to or otherwise represents a single entity distinct from the other connected subgraphs within the heterogeneous graph data structure. Thereafter, the heterogeneous matching process 800 performs one or more actions on the related records in accordance with the reconciliation rules (task 814), for example, to reconcile field values across the related records, deduplicate related records, unify related records and/or the like.

Figures 9, 10:
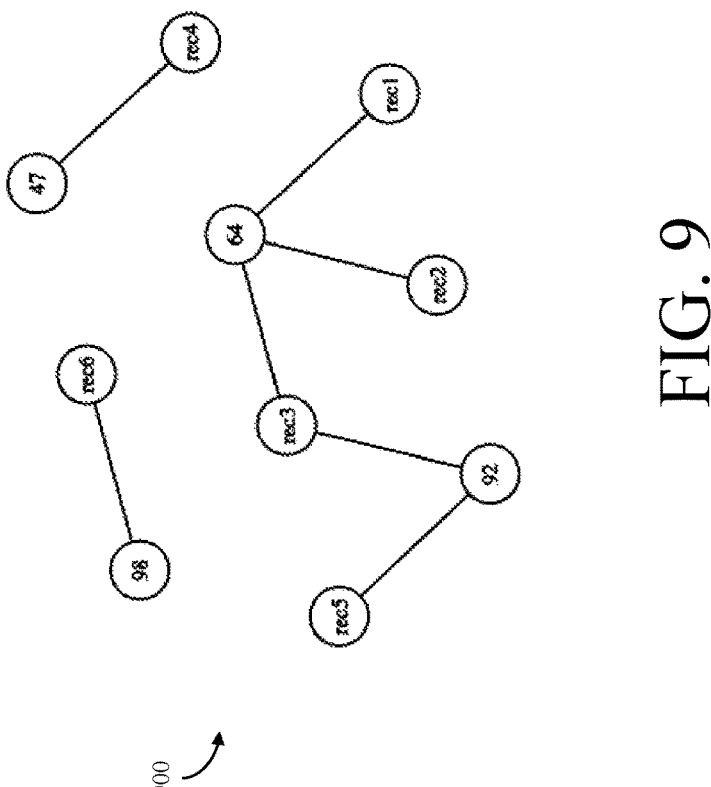
FIG. 9 depicts a heterogenous graph data structure for the records of FIG. 3 suitable for use with the heterogeneous matching process of FIG. 8 according to an example implementation.
FIG. 10 depicts a groups of related records identified using the heterogenous graph data structure of FIG. 9 in connection with the heterogeneous matching process of FIG. 8 according to an example implementation.
Figure 11:
FIG. 11 depicts a unified record suitable for generation by a data unification service in the system of FIG. 1 in connection with the heterogeneous matching process of FIG. 8 according to an example implementation.

FIGS. 9-11 depict an exemplary set of heterogeneous graph data structure 900 and a resulting unified data record 1100 that may be generated by the data unification service 118 implementing the heterogenous matching process 800 for the matching rule of "fuzzy(firstName) AND fuzzy (lastName) AND exact(email)" from the set of records 300 and corresponding SRIs of FIGS. 3-7. In this regard, for each of the records 300, the heterogenous matching process 800 attempts to map the firstName field value to a corresponding SRI in the fuzzy token database 500 (if one exists), map the lastName field value to a corresponding SRI in the fuzzy token database 700 (if one exists), and then calculate or otherwise determine a match key value to be assigned to the respective record based on the mapped firstName SRI value, the mapped lastName SRI value, and the value for the email field of the respective record. For example, for the first record (rec1), the heterogenous matching process 800 maps the James value for the firstName field to the SRI value of 1, the Smith value for the lastName field to the SRI value of 2, and calculates or otherwise determines a match key value of 64 for the first record as a function of the SRI values and the email address associated with the record (e.g., hash(1, 2,user1@domain)=64). Similarly, for the second record (rec2), the heterogenous matching process 800 maps the Jim value for the firstName field to the SRI value of 1, the Smith value for the lastName field to the SRI value of 2, and calculates or otherwise determines a match key value of 64 for the first record as a function of the SRI values and the email address associated with the record (e.g., hash(1,2, user1@domain)=64). For the third record, the heterogenous matching process 800 maps the Smithe value for the lastName field to two different SRI values (e.g., 2 and 3), and therefore, the heterogenous matching process 800 calculates two different match key values (e.g., 64 and 92) for the third record to account for the different potential combinations of SRI values for the record (e.g., hash(1,2,user1@domain)=64 and hash(1,3,user1@domain)=92). In a similar manner, the heterogenous matching process 800 calculates match key values for the remaining records of interest (e.g., hash(ted, 3,user1@domain)=47 match key value for rec4, hash(1,3, user1@domain)=92 match key value for rec5, and hash(1, 2,user2@domain)=98 match key value for rec6).

FIG. 9 depicts the heterogeneous graph data structure 900 that is constructed by the heterogenous matching process 800 using connected component clustering with the assigned match key values as vertices between related records. In this regard, by virtue of the match key value of 64 being assigned to each of rec1, rec2 and rec3, the vertex for the match key value of 64 has edges that link the match key value of 64 to each of the records rec1, rec2 and rec3. Additionally, by virtue of the match key value of 92 being assigned to each of rec3 and rec5, the vertex for the match key value of 92 has edges that link the match key value of 92 to each of the records rec3 and rec5, while the fourth and sixth records (rec4 and rec6) were assigned unique match key values that are not shared in common with any other of the records 300. After constructing the heterogeneous graph data structure 900, the heterogenous matching process 800 performs one or more clustering techniques on the heterogenous graph data structure 900 to identify the cluster of records rec1, rec2, rec3 and rec5 as a group of related records to be assigned to a first entity (Entity1) while the standalone records rec4 and rec6 are assigned to separate entities (Entity2 and Entity 3) as shown in FIG. 10.

FIG. 11 depicts a unified record 1100 for the entity corresponding to the luster of related records identified from the heterogeneous graph data structure 900 after post-processing using the reconciliation rules 126 to select or otherwise determine values for the fields of the unified record 1100. For example, the reconciliation rules 126 may specify that the values chosen for the firstName and lastName fields be obtained from the record of the group of related records that was most recently created or updated. In this regard, FIG. 11 depicts an example where the timestamp associated with the first record rec1 is more recent than the timestamps associated with the other related records rec2, rec3 and rec5, and therefore, the firstName and lastName fields of the unified record 1100 are populated with the values for the firstName and lastName fields of the first record rec1. As another example, the reconciliation rules 126 may specify that the values chosen for the street_address, city and state fields be obtained from the record of the group of related records that is associated with the highest quality data source 102, such that the street_address, city and state fields of the unified record 1100 are populated with the values from those fields of the third record rec3. In some implementations, the data unification service 118 creates the entry for the unified record 1100 in a data table 108 of the database 106 that maintains unified profiles for individuals or points of contact that may be referenced rather than relying on another record in the database 106 that is associated with an individual data source 102 that may have incomplete, inaccurate, or outdated field values relative to the unified record 1100. In yet other implementations, the data unification service 118 may utilize the unified record 1100 to deduplicate the database 106, for example, by deleting or otherwise removing the rec1, rec2, rec3 and rec5 records from the database 106. In this regard, it will be appreciated that there are numerous different types of cleansing, normalizing, validation, deduplication, reconciliation and/or resolution techniques that may be performed with respect to related records, and the subject matter is not intended to be limited to any particular technique or implementation.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 12A:
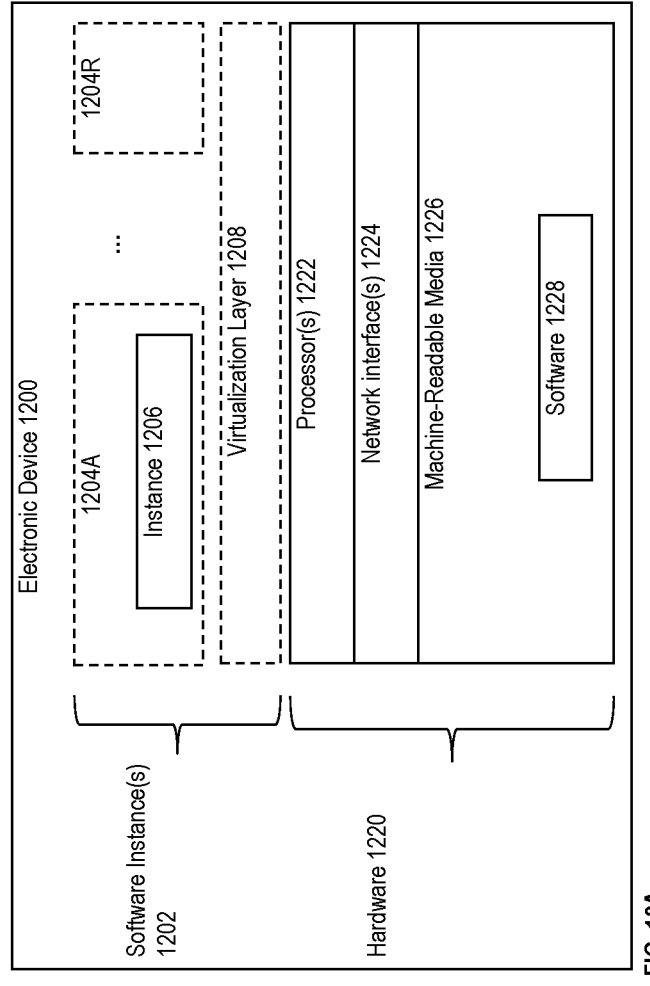
FIG. 12A is a block diagram illustrating an electronic device according to some example implementations.

FIG. 12A is a block diagram illustrating an electronic device 1200 according to some example implementations. FIG. 12A includes hardware 1220 comprising a set of one or more processor(s) 1222, a set of one or more network interfaces 1224 (wireless and/or wired), and machine-readable media 1226 having stored therein software 1228 (which includes instructions executable by the set of one or more processor(s) 1222). The machine-readable media 1226 may include non-transitory and/or transitory machine-readable media. Each of the previously described clients and the data unification service may be implemented in one or more electronic devices 1200. In one implementation: 1) each of the clients is implemented in a separate one of the electronic devices 1200 (e.g., in end user devices where the software 1228 represents the software to implement clients to interface directly and/or indirectly with the data unification service (e.g., software 1228 represents a web browser, a native client, a portal, a command-line interface, and/or an application programming interface (API) based upon protocols such as Simple Object Access Protocol (SOAP), Representational State Transfer (REST), etc.)); 2) the data unification service is implemented in a separate set of one or more of the electronic devices 1200 (e.g., a set of one or more server devices where the software 1228 represents the software to implement the data unification service); and 3) in operation, the electronic devices implementing the clients and the data unification service would be communicatively coupled (e.g., by a network) and would establish between them (or through one or more other layers and/or or other services) connections for submitting requests to the data unification service. Other configurations of electronic devices may be used in other implementations (e.g., an implementation in which the client and the data unification service are implemented on a single one of electronic device 1200).

During operation, an instance of the software 1228 (illustrated as instance 1206 and referred to as a software instance; and in the more specific case of an application, as an application instance) is executed. In electronic devices that use compute virtualization, the set of one or more processor(s) 1222 typically execute software to instantiate a virtualization layer 1208 and one or more software container(s) 1204A-1204R (e.g., with operating system-level virtualization, the virtualization layer 1208 may represent a container engine (such as Docker Engine by Docker, Inc. or rkt in Container Linux by Red Hat, Inc.) running on top of (or integrated into) an operating system, and it allows for the creation of multiple software containers 1204A-1204R (representing separate user space instances and also called virtualization engines, virtual private servers, or jails) that may each be used to execute a set of one or more applications; with full virtualization, the virtualization layer 1208 represents a hypervisor (sometimes referred to as a virtual machine monitor (VMM)) or a hypervisor executing on top of a host operating system, and the software containers 1204A-1204R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1228 is executed within the software container 1204A on the virtualization layer 1208. In electronic devices where compute virtualization is not used, the instance 1206 on top of a host operating system is executed on the "bare metal" electronic device 1200. The instantiation of the instance 1206, as well as the virtualization layer 1208 and software containers 1204A-1204R if implemented, are collectively referred to as software instance(s) 1202.

Alternative implementations of an electronic device may have numerous variations from that described above. For example, customized hardware and/or accelerators might also be used in an electronic device.

Figure 12B:
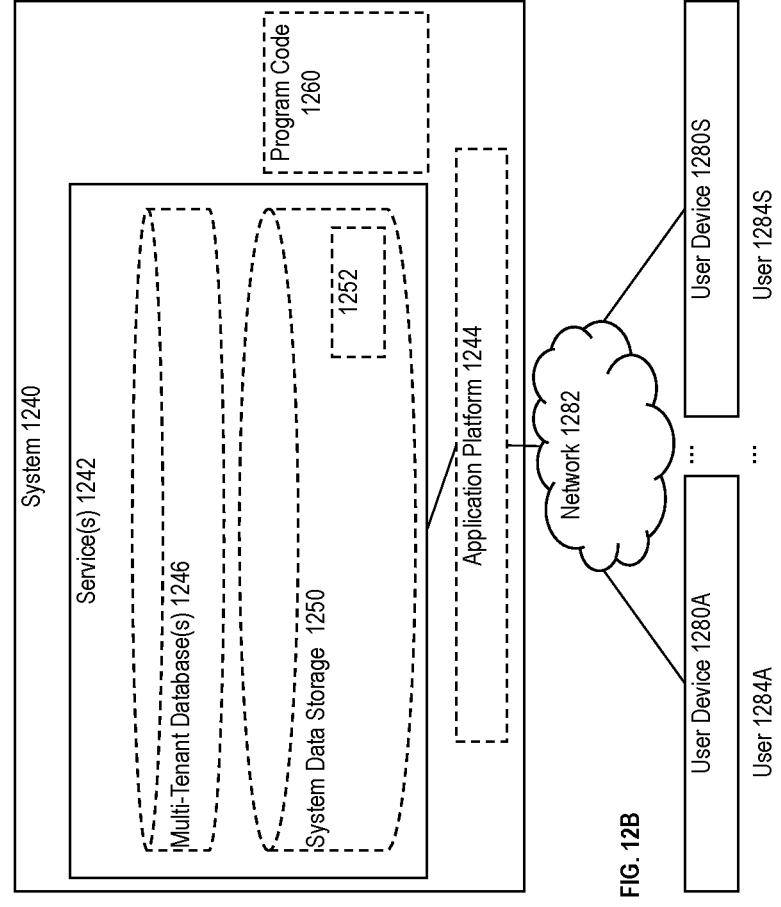
FIG. 12B is a block diagram of a deployment environment according to some example implementations.

FIG. 12B is a block diagram of a deployment environment according to some example implementations. A system 1240 includes hardware (e.g., a set of one or more server devices) and software to provide service(s) 1242, including the data unification service. In some implementations the system 1240 is in one or more datacenter(s). These datacenter(s) may be: 1) first party datacenter(s), which are datacenter(s) owned and/or operated by the same entity that provides and/or operates some or all of the software that provides the service(s) 1242; and/or 2) third-party datacenter(s), which are datacenter(s) owned and/or operated by one or more different entities than the entity that provides the service(s) 1242 (e.g., the different entities may host some or all of the software provided and/or operated by the entity that provides the service(s) 1242). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1240 is coupled to user devices 1280A-1280S over a network 1282. The service(s) 1242 may be on-demand services that are made available to one or more of the users 1284A-1284S working for one or more entities other than the entity which owns and/or operates the on-demand services (those users sometimes referred to as outside users) so that those entities need not be concerned with building and/or maintaining a system, but instead may make use of the service(s) 1242 when needed (e.g., when needed by the users 1284A-1284S). The service(s) 1242 may communicate with each other and/or with one or more of the user devices 1280A-1280S via one or more APIs (e.g., a REST API). In some implementations, the user devices 1280A-1280S are operated by users 1284A-1284S, and each may be operated as a client device and/or a server device. In some implementations, one or more of the user devices 1280A-1280S are separate ones of the electronic device 1200 or include one or more features of the electronic device 1200.

In some implementations, the system 1240 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1240 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1240 may include an application platform 1244 that enables PAAS for creating, managing, and executing one or more applications developed by the provider of the application platform 1244, users accessing the system 1240 via one or more of user devices 1280A-1280S, or third-party application developers accessing the system 1240 via one or more of user devices 1280A-1280S.

In some implementations, one or more of the service(s) 1242 may use one or more multi-tenant databases 1246, as well as system data storage 1250 for system data 1252 accessible to system 1240. In certain implementations, the system 1240 includes a set of one or more servers that are running on server electronic devices and that are configured to handle requests for any authorized user associated with any tenant (there is no server affinity for a user and/or tenant to a specific server). The user devices 1280A-1280S communicate with the server(s) of system 1240 to request and update tenant-level data and system-level data hosted by system 1240, and in response the system 1240 (e.g., one or more servers in system 1240) automatically may generate one or more Structured Query Language (SQL) statements (e.g., one or more SQL queries) that are designed to access the desired information from the multi-tenant database(s) 1246 and/or system data storage 1250.

In some implementations, the service(s) 1242 are implemented using virtual applications dynamically created at run time responsive to queries from the user devices 1280A-

1280S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1244 includes an application setup mechanism that supports application developers' creation and management of applications, which may be saved as metadata by save routines. Invocations to such applications, including the data unification service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $12^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1240 and the user devices 1280A-1280S.

Each user device 1280A-1280S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1240. For example, the user interface device can be used to access data and applications hosted by system 1240, and to perform searches on stored data, and otherwise allow one or more of users 1284A-1284S to interact with various GUI pages that may be presented to the one or more of users 1284A-1284S. User devices 1280A-1280S might communicate with system 1240 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1280A-1280S might include an HTTP client, commonly referred to as a "browser," for sending and receiving HTTP messages to and from server(s) of system 1240, thus allowing users 1284A-1284S of the user devices 1280A-1280S to access, process and view information, pages and applications available to it from system 1240 over network 1282.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of managing a plurality of existing records at a database system, the method comprising:

obtaining, at the database system, a data stream for ingestion by the database system from a first data source different from a second data source, the second data source being associated with the plurality of existing records at the database system, the data stream comprising one or more new or updated records;

clustering respective records of the plurality of existing records and the one or more new or updated records into clusters of related records based at least in part on an actual field value for an exact matched field of the respective record comprising a common value for the exact matched field of a respective cluster of related records and one or more respective values for one or more fuzzy matched fields of the respective record;

identifying a distinct subset of related records to be assigned to an entity from among the respective cluster of related records using one or more fuzzy matching criteria for the one or more fuzzy matched fields of the respective cluster of related records, the distinct subset of related records including at least one new or updated record from the first data source and at least one existing record associated with the second data source, wherein query operations to identify the distinct subset are $t \times \log(k)$, where $t$ is a number of fuzzy match identifiers that is less than a number of fields per record and $k$ is a number of distinct field values for the one or more fuzzy matched fields that is less than a total number of records;

selecting one or more values for the one or more fuzzy matched fields from a respective record of the distinct subset of related records, resulting in one or more selected values for the one or more fuzzy matched fields; and creating, in a data table maintaining unified profiles at the database system, a unified record for the entity corresponding to the distinct subset of related records using the distinct subset of related records at the database system, the unified record comprising the common value for the exact matched field and the one or more selected values for the one or more fuzzy matched fields.

2. The method of claim 1, wherein creating the unified record comprises creating a top level entity for the distinct subset of related records at the database system.

3. The method of claim 1, wherein the one or more fuzzy matching criteria include at least one of semantic similarity, typographical similarity and phonetic similarity.

4. The method of claim 1, wherein:

the exact matched field comprises an email field; and clustering respective records of the plurality of existing records into the clusters of related records comprises identifying a group of records of the plurality of existing records and the one or more new or updated records having the common value for the email field of the respective records of the group of records.

5. The method of claim 4, wherein the one or more fuzzy matched fields comprises a name field and identifying the distinct subset of related records comprises identifying a distinct subset of the group of records having respective values for the name field that fuzzy match with a desired similarity.

6. The method of claim 5, further comprising determining the name field values fuzzy match based on a pairwise distance between the respective values for the name field.

7. The method of claim 1, wherein identifying the distinct subset of related records comprises identifying the distinct subset of related records based on a pairwise distance between a fuzzy matched field of respective pairs of related records of the respective cluster of related records.

8. The method of claim 1, further comprising assigning a common match key value to the distinct subset of related records that fuzzy match a fuzzy matched field.

9. The method of claim 8, further comprising calculating the common match key value associated with a respective record of the distinct subset of related records as a function of a respective field value for the fuzzy matched field of the respective record.

10. The method of claim 1, wherein creating the unified record comprises selecting the one or more values for the one or more fuzzy matched fields of the unified record from a respective record of the distinct subset of related records having a most recent timestamp.

11. The method of claim 1, further comprising deduplicating a database at the database system by deleting the distinct subset of related records.

12. At least one non-transitory machine-readable storage medium that provides instructions that, when executed by at least one processor, are configurable to cause the at least one processor to perform operations comprising:

obtaining a data stream for ingestion by a database system from a first data source different from a second data source, the second data source being associated with a plurality of existing records at the database system, the data stream comprising one or more new or updated records;

clustering respective records of the plurality of existing records at the database system and the one or more new or updated records into clusters of related records based at least in part on an actual field value for an exact matched field of the respective record comprising a common value for the exact matched field of a respective cluster of related records and one or more respective values for one or more fuzzy matched fields of the respective record;

identifying a distinct subset of related records to be assigned to an entity from among the respective cluster of related records using one or more fuzzy matching criteria for the one or more fuzzy matched fields of the respective cluster of related records, the distinct subset of related records including at least one new or updated record from the first data source and at least one existing record associated with the second data source, wherein query operations to identify the distinct subset are t×log(k), where t is a number of fuzzy match identifiers that is less than a number of fields per record and k is a number of distinct field values for the one or more fuzzy matched fields that is less than a total number of records;

selecting one or more values for the one or more fuzzy matched fields from a respective record of the distinct subset of related records, resulting in one or more selected values for the one or more fuzzy matched fields; and creating a unified record for the entity corresponding to the distinct subset of related records in a data table maintaining unified profiles at the database system using the distinct subset of related records at the database system, the unified record comprising the common value for the exact matched field and the one or more selected values for the one or more fuzzy matched fields.

13. The at least one non-transitory machine-readable storage medium of claim 12, wherein the unified record comprises a top level entity for the distinct subset of related records at the database system.

14. The at least one non-transitory machine-readable storage medium of claim 12, wherein the exact matched field comprises an email field.

15. The at least one non-transitory machine-readable storage medium of claim 14, wherein the one or more fuzzy matched fields comprises a name field.

16. The at least one non-transitory machine-readable storage medium of claim 12, wherein a first cluster of the clusters of related records comprises a group of records of the plurality of existing records and the one or more new or updated records having the common value for an email field of the respective records of the group of records.

17. The at least one non-transitory machine-readable storage medium of claim 16, wherein the distinct subset of related records comprises a distinct subset of the group of records having respective values for a name field of the respective records of the distinct subset of the group of records that fuzzy match with a desired similarity.

18. The method of claim 1, wherein selecting one or more values for the one or more fuzzy matched fields comprises selecting the one or more values for the one or more fuzzy matched fields from the respective record of the distinct subset of related records that is associated with one of the first data source and the second data source based on a quality metric.

19. The method of claim 1, further comprising referencing, by an instance of a virtual application dynamically created by an application platform of the database system at run time, the unified record rather than another record associated with the first data source or the second data source.

* * * * *